(12) United States Patent
Suzuki

(10) Patent No.: US 10,339,285 B2
(45) Date of Patent: Jul. 2, 2019

(54) AUTHENTICATION SELECTION FOR INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yoshiharu Suzuki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 41 days.

(21) Appl. No.: 14/949,017

(22) Filed: Nov. 23, 2015

(65) Prior Publication Data

US 2016/0357976 A1 Dec. 8, 2016

(30) Foreign Application Priority Data

Jun. 3, 2015 (JP) ................................. 2015-113041

(51) Int. Cl.
*G06F 7/04* (2006.01)
*H04L 9/32* (2006.01)
(Continued)

(52) U.S. Cl.
CPC .............. *G06F 21/31* (2013.01); *G06F 21/45* (2013.01); *H04L 63/08* (2013.01); *H04L 63/105* (2013.01);
(Continued)

(58) Field of Classification Search
CPC .. G06F 21/31; G06F 21/45; G06F 2221/2113; H04L 63/0884; H04L 63/0838
(Continued)

(56) References Cited

U.S. PATENT DOCUMENTS

2003/0163583 A1* 8/2003 Tarr ........................ H04L 29/06
709/245
2003/0191849 A1* 10/2003 Leong ................... G06F 16/182
709/229
(Continued)

FOREIGN PATENT DOCUMENTS

JP 2003-303175 A 10/2003
JP 2004-5273 A 1/2004
(Continued)

OTHER PUBLICATIONS

Communication dated Dec. 18, 2018 issued by the Japanese Patent Office in counterpart application No. 2015-113041.

*Primary Examiner* — Aravind K Moorthy
(74) *Attorney, Agent, or Firm* — Sughrue Mion, PLLC

(57) ABSTRACT

An information processing apparatus includes a determination unit, a first acquisition unit, and a controller. The determination unit receives, from a first terminal apparatus, a request for use issued to a document management apparatus and specifies an authentication mode necessary for the use. The first acquisition unit acquires information indicating an authentication mode supported by the first terminal apparatus. The controller performs, in a case where the authentication mode indicated by the acquired information does not match the specified authentication mode, control to output to the first terminal apparatus information on a second terminal apparatus that supports the specified authentication mode.

14 Claims, 11 Drawing Sheets

(51) Int. Cl.
  *G06F 21/00* (2013.01)
  *G06F 21/31* (2013.01)
  *G06F 21/45* (2013.01)
  *H04L 29/06* (2006.01)

(52) U.S. Cl.
  CPC .... *H04L 63/205* (2013.01); *G06F 2221/2113* (2013.01)

(58) Field of Classification Search
  USPC ............... 726/27, 5, 7, 26; 713/168, 182
  See application file for complete search history.

(56) References Cited

U.S. PATENT DOCUMENTS

| | | | | |
|---|---|---|---|---|
| 2008/0065741 | A1* | 3/2008 | Stratton | G06Q 30/02 709/217 |
| 2010/0146262 | A1* | 6/2010 | Zhang | H04W 12/06 713/155 |
| 2011/0302627 | A1* | 12/2011 | Blom | H04L 63/0492 726/2 |
| 2012/0060025 | A1* | 3/2012 | Cahill | H04L 63/10 713/155 |
| 2012/0202464 | A1* | 8/2012 | Sakai | H04W 8/22 455/411 |
| 2014/0188804 | A1* | 7/2014 | Gokhale | G06F 21/6218 707/645 |
| 2014/0355057 | A1* | 12/2014 | Jang | G06K 7/10297 358/1.15 |
| 2014/0355063 | A1* | 12/2014 | Jang | G06F 3/1205 358/1.15 |
| 2014/0375138 | A1* | 12/2014 | Sako | B60L 11/1816 307/104 |
| 2015/0229650 | A1* | 8/2015 | Grigg | H04L 63/105 726/7 |
| 2015/0261972 | A1* | 9/2015 | Lee | G06F 21/6218 713/165 |
| 2015/0317630 | A1* | 11/2015 | Piel | G06Q 20/40 705/44 |
| 2016/0055324 | A1* | 2/2016 | Agarwal | G06F 21/31 726/17 |
| 2016/0072784 | A1* | 3/2016 | Liang | H04L 63/0892 726/4 |
| 2016/0148201 | A1* | 5/2016 | Kadaster | G06Q 20/02 705/44 |
| 2016/0150365 | A1* | 5/2016 | Brown | H04W 4/021 455/410 |
| 2017/0070638 | A1* | 3/2017 | Min | G06F 21/608 |

FOREIGN PATENT DOCUMENTS

| | | |
|---|---|---|
| JP | 2006-195811 A | 7/2006 |
| JP | 2007-156959 A | 6/2007 |
| JP | 2009-211566 A | 9/2009 |

\* cited by examiner

| OBJECT ID | TARGET OPERATION | REQUIRED AUTHENTICATION-MODE ID |
|---|---|---|
| DOCUMENT-1 | OPERATIONS OTHER THAN UPDATE | NONE |
| DOCUMENT-2 | UPDATE OPERATION | AUTHENTICATION MODE 3 |
| DOCUMENT-3 | ALL OPERATIONS | NONE |
| FOLDER-1 | ALL OPERATIONS | AUTHENTICATION MODE 3 |
| FOLDER-2 | ALL OPERATIONS | AUTHENTICATION MODE 2 |

FIG. 7

| AUTHENTICATION-METHOD ID | AUTHENTICATION-MODE NAME | DATA-FORMAT ID |
|---|---|---|
| AUTHENTICATION MODE 1 | ID-AND-PASSWORD AUTHENTICATION | 0 |
| AUTHENTICATION MODE 2 | IC-CARD AUTHENTICATION | 1 |
| AUTHENTICATION MODE 3 | FACE AUTHENTICATION | 2 |
| AUTHENTICATION MODE 4 | FINGERPRINT AUTHENTICATION | 4 |

FIG. 8

| DATA-FORMAT ID | DATA-FORMAT NAME |
|---|---|
| 0 | CHARACTER STRING |
| 1 | IC DATA |
| 2 | PICTURE IMAGE |
| 3 | VOICE |
| 4 | FINGERPRINT |

FIG. 9

| ALTERNATIVE-MODE ID | ALTERNATIVE-MODE NAME | AUTHENTICATION-MODE ID |
|---|---|---|
| ALTERNATIVE MODE 1 | CAMERA AUTHENTICATION AT PORTABLE TERMINAL | AUTHENTICATION MODE 3 |

FIG. 10

| TERMINAL ID | LAST NEGOTIATION DATE AND TIME | IP ADDRESS | POSITION INFORMATION | DESCRIPTION OF INSTALLATION LOCATION | TRANSMISSION VALID DATA-FORMAT ID |
|---|---|---|---|---|---|
| 1 | 01-01-2015 T10:10:10 | 123.456.111.222 | XXX, YYY | 10TH FLOOR, SOUTH | 0, 2 |
| 2 | 01-02-2015 T11:10:10 | 123.456.111.333 | AAA, BBB | 11TH FLOOR, NORTH | 0, 1, 2 |
| 3 | 01-03-2015 T12:10:10 | 123.456.111.444 | CCC, DDD | 12TH FLOOR, CENTRAL AREA | 0, 1 |

AUTHENTICATION SELECTION FOR INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-113041 filed Jun. 3, 2015.

BACKGROUND (i) Technical Field

The present invention relates to an information processing apparatus, an image processing method, and a non-transitory computer readable medium.

(ii) Related Art

A technology is known that performs switching between authentication modes required of the user in accordance with, for example, the degree of importance in terms of data security.

SUMMARY

According to an aspect of the invention, there is provided an information processing apparatus including a determination unit, a first acquisition unit, and a controller. The determination unit receives, from a first terminal apparatus, a request for use issued to a document management apparatus and specifies an authentication mode necessary for the use. The first acquisition unit acquires information indicating an authentication mode supported by the first terminal apparatus. The controller performs, in a case where the authentication mode indicated by the acquired information does not match the specified authentication mode, control to output to the first terminal apparatus information on a second terminal apparatus that supports the specified authentication mode.

BRIEF DESCRIPTION OF THE DRAWINGS

An exemplary embodiment of the present invention will be described in detail based on the following figures, wherein:

FIG. 7 is a diagram illustrating an example of an authentication mode table;

FIG. 8 is a diagram illustrating an example of a data-format table;

FIG. 9 is a diagram illustrating an example of an alternative-authentication-mode table;

FIG. 10 is a diagram illustrating an example of an authenticated-terminal table;

DETAILED DESCRIPTION

Figure 1:
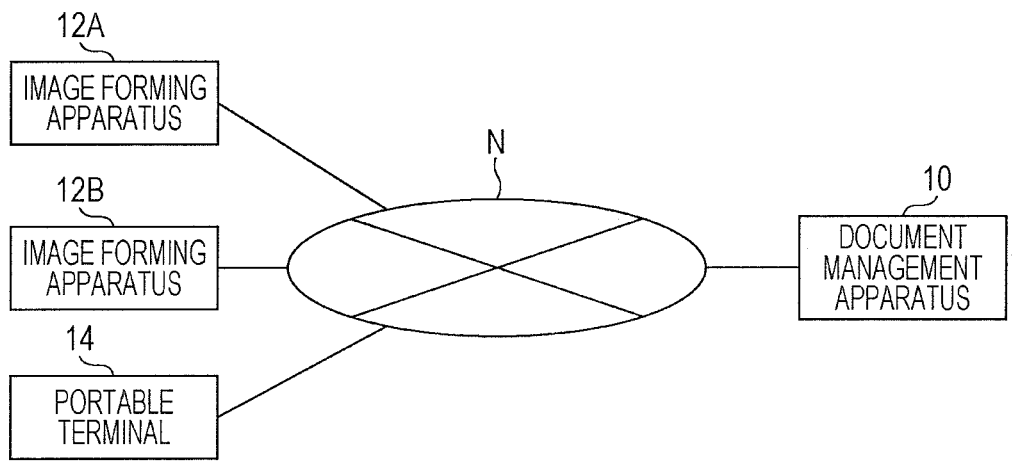
FIG. 1 is a block diagram illustrating an example of a document management system according to an exemplary embodiment of the present invention.

FIG. 1 illustrates an example of a document management system according to an exemplary embodiment of the present invention. The document management system includes, for example, a document management apparatus 10 serving as an information processing apparatus, and plural image forming apparatuses serving as terminal apparatuses (for example, image forming apparatuses 12A and 12B). The document management apparatus 10 and the image forming apparatuses 12A and 12B are connected to a communication path N such as a network. In addition, a portable terminal 14 is connected to the communication path N. Note that two image forming apparatuses are included in the document management system in the example illustrated in FIG. 1; however, this is a mere example. Three or more image forming apparatuses may be included in the document management system. In addition, the portable terminal 14 does not have to be included in the document management system.

The document management apparatus 10 is an apparatus that stores document data, and has the function of transmitting and receiving data to and from other apparatuses. Document data is, for example, data supplied from an apparatus such as the image forming apparatus 12A or 12B to the document management apparatus 10. Document data may be text data represented by characters, image data, or data represented by characters and images.

The image forming apparatuses 12A and 12B are apparatuses having at least one of a scan function, a printer function, a copy function, and a facsimile function. In addition, the image forming apparatuses 12A and 12B have the function of transmitting and receiving data to and from other apparatuses. In the present exemplary embodiment, as an example, the image forming apparatus 12A is equipped with an imaging unit such as a camera, and the image forming apparatus 12B is not equipped with an imaging unit. The imaging unit is used for, for example, face authentication.

The portable terminal 14 is a device equipped with an imaging unit such as a camera, and examples of the portable terminal 14 are devices such as a smartphone, a portable phone, a tablet personal computer (PC), and a PC. In addition, the portable terminal 14 has the function of transmitting and receiving data to and from other apparatuses.

For example, it is assumed that a login to the document management apparatus 10 is performed using an apparatus such as the image forming apparatus 12A or 12B, and document data stored in the document management apparatus 10 is used in the apparatus such as the image forming apparatus 12A or 12B. As another example, document data is generated by an apparatus such as the image forming apparatus 12A or 12B, and the document data may be transmitted to and stored in the document management apparatus 10. In the present exemplary embodiment, there may be the case where authentication is required in the case of, for example, a login to or use or the document management apparatus 10.

In the following, the configurations of the document management apparatus 10, the image forming apparatuses 12A and 12B, and the portable terminal 14 will be described in detail.

Figure 2:
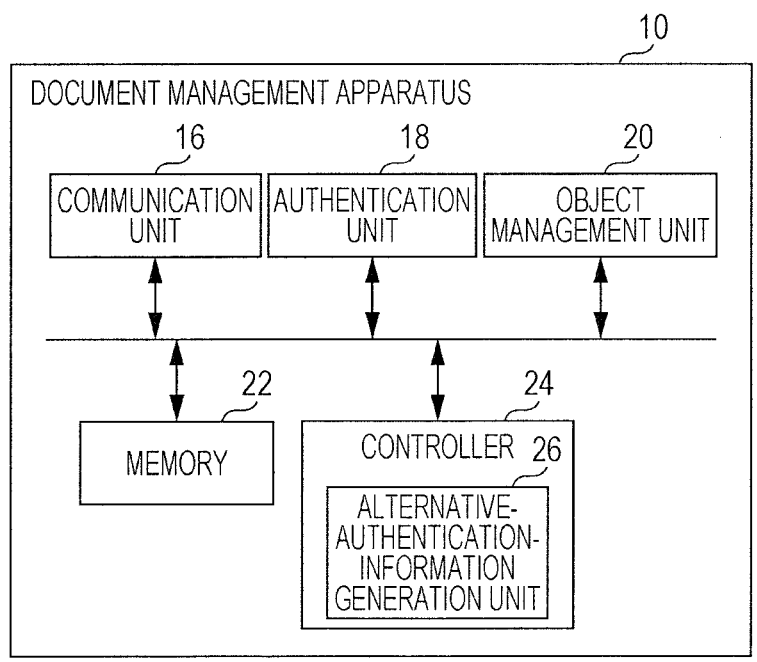
FIG. 2 is a block diagram illustrating an example of a document management apparatus according to the exemplary embodiment.

FIG. 2 illustrates the configuration of the document management apparatus 10.

A communication unit 16 is a communication interface, and has the function of transmitting data to other apparatuses and the function of receiving data from other apparatuses. For example, the communication unit 16 transmits and receives document data, receives authentication information, and the like.

An authentication unit 18 has the function of performing an authentication process using authentication information. For example, a password authentication process in which information such as a password and a user ID are used as authentication information, an IC-card authentication process in which information (for example, an ID or a password) stored in an IC card is used as authentication information, or a biometric authentication process in which biometric information of the user is used as authentication information is used as the authentication process. For example, a face authentication process in which face image data representing the face of the user is used, a voice authentication process in which voice data representing the voice of the user is used, a fingerprint authentication process in which fingerprint information of the user is used, or a vein authentication process in which a vein pattern of the user is used is used as the biometric authentication process. As a matter of course, an authentication process other than these authentication processes may also be performed. Authentication information is stored in a memory 22. For example, in the case where authentication information is transmitted from an apparatus such as the image forming apparatus 12A or 12B when, for example, a login to the document management apparatus 10 is performed or specific document data is accessed, the authentication unit 18 performs an authentication process using the authentication information stored in the memory 22 and the authentication information transmitted from the apparatus. In the case where the authentication information stored in the memory 22 agrees with the authentication information transmitted from the apparatus, and authentication has been successful (for example, in the case where the authentication information stored in the memory 22 matches the authentication information transmitted from the apparatus), a login or access is allowed. In the case where authentication has been failed (for example, in the case where the authentication information stored in the memory 22 does not match the authentication information transmitted from the apparatus), a login or access is prohibited.

An object management unit 20 has the function of managing objects. An object is, for example, document data or a folder in which document data is stored. For example, the object management unit 20 manages document data stored in the document management apparatus 10, storage locations of folders and the like in which document data is stored, and operation rights (access rights) to the document data and folders. As an example, the object management unit 20 stores, in the memory 22, document data transmitted from an apparatus such as the image forming apparatus 12A or 12B.

The memory 22 is a storage device such as a hard disk. The memory 22 stores document data, authentication information, and the like.

A controller 24 has the function of controlling operations of units included in the document management apparatus 10. In addition, the controller 24 includes an alternative-authentication-information generation unit 26.

The alternative-authentication-information generation unit 26 has the function of generating, in the case where an apparatus trying to use the document management apparatus 10 does not support an authentication mode required for use of the document management apparatus 10, information on an apparatus that supports the authentication mode. For example, in the case where an apparatus used to perform a login to the document management apparatus 10 does not support an authentication mode required for the login, the alternative-authentication-information generation unit 26 generates information on an apparatus that supports the authentication mode. In addition, the alternative-authentication-information generation unit 26 may also generate information on an alternative authentication mode as an alternative to the authentication mode. These pieces of information are transmitted to the apparatus. The process performed by the alternative-authentication-information generation unit 26 will be described in detail with reference to FIG. 11 and the subsequent drawings.

Figure 3:
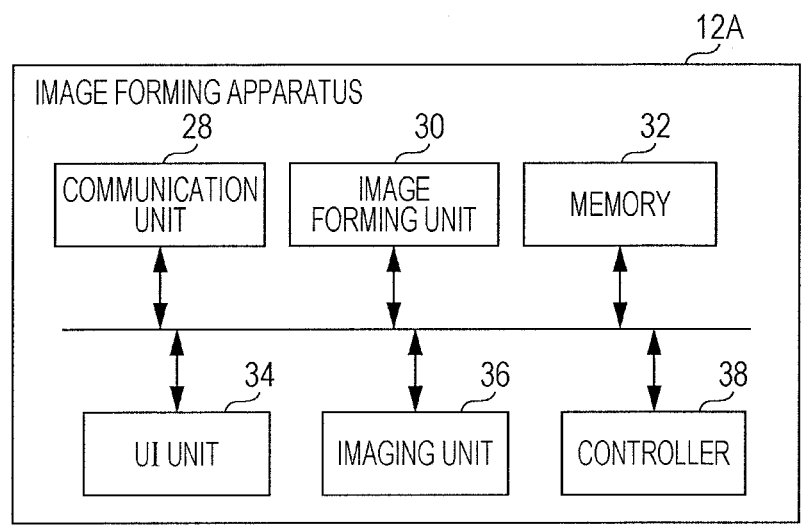
FIG. 3 is a block diagram illustrating an example of an image forming apparatus.

FIG. 3 illustrates the configuration of the image forming apparatus 12A.

A communication unit 28 is a communication interface, and has the function of transmitting data to other apparatuses and the function of receiving data from other apparatuses. For example, the communication unit 28 transmits and receives document data, transmits authentication information, and the like.

An image forming unit 30 has at least one of a scan function, a printer function, a copy function, and a facsimile function. For example, document data is generated by executing the scan function, and the document data may be transmitted to and stored in the document management apparatus 10. As another example, the document data stored in the document management apparatus 10 may be printed by executing the printer function.

A memory 32 is a storage device such as a hard disk. The memory 32 stores, for example, document data and the like.

A user interface (UI) unit 34 is a user interface and includes a display and an operation unit. The display is, for example, a display device such as a liquid crystal display. The operation unit is, for example, an input device such as an operation panel.

An imaging unit 36 is a camera. The imaging unit 36 is used in the case where, for example, a face authentication process is applied. Since the image forming apparatus 12A is equipped with the imaging unit 36, the image forming apparatus 12A is an apparatus that supports a face authentication mode.

A controller 38 controls operations of units included in the image forming apparatus 12A.

Figure 4:
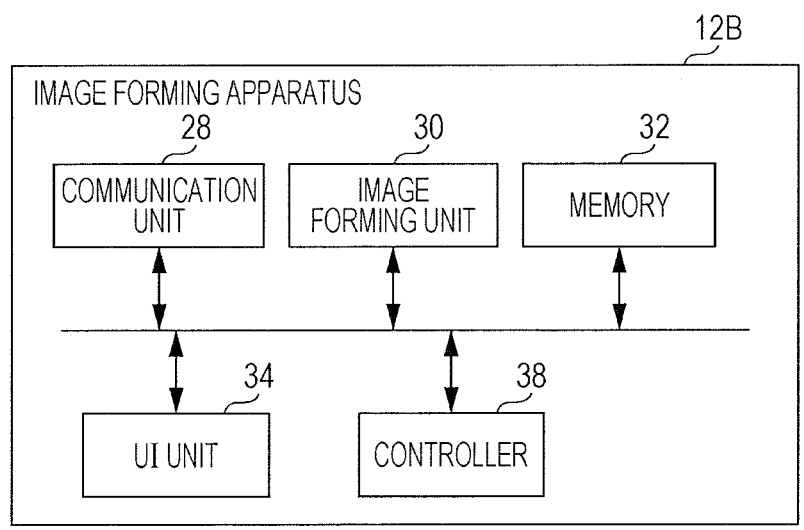
FIG. 4 is a block diagram illustrating an example of the image forming apparatus.

FIG. 4 illustrates the configuration of the image forming apparatus 12B. Similarly to the image forming apparatus 12A, the image forming apparatus 12B includes the communication unit 28, the image forming unit 30, the memory 32, the UI unit 34, and the controller 38. Unlike the image forming apparatus 12A, the image forming apparatus 12B is not equipped with the imaging unit 36. That is, the image forming apparatus 12B is an apparatus that does not support a face authentication mode.

Figures 5, 6:
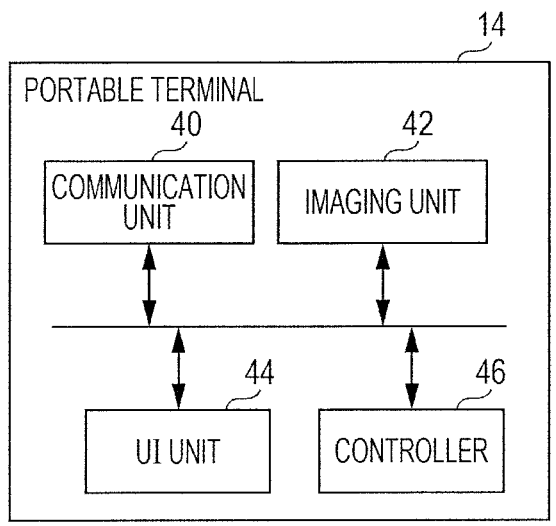
FIG. 5 is a block diagram illustrating an example of a portable terminal.
FIG. 6 is a diagram illustrating an example of an object right table.

FIG. 5 illustrates the configuration of the portable terminal 14. The portable terminal 14 is, for example, a device used in the case where an authentication process for an alternative authentication mode is applied. A communication unit 40 is a communication interface, and has the function of transmitting data to other apparatuses and the function of receiving data from other apparatuses. An imaging unit 42 is a camera. The imaging unit 42 is used in the case where, for example, a face authentication mode is applied as an alternative authentication mode. A UI unit 44 is a user interface and includes a display and an operation unit. The display is, for example, a display device such as a liquid crystal display. The operation unit is, for example, an input device such as a touch panel or a keyboard. A controller 46 controls operations of units included in the portable terminal 14.

In the following, the document management apparatus 10 will be described in detail.

FIG. 6 illustrates an example of an object right table. This object right table is information indicating an authentication mode required for operation of document data, folders, and the like. This object right table is generated by the object management unit 20 of the document management apparatus 10, and stored in the memory 22. For example, every time document data is stored in the document management apparatus 10, the content of the object right table is updated.

Specifically, the object right table illustrates a correspondence relationship between an object ID, a target operation, and a required authentication-mode ID. The object ID is, for example, document identification information for identifying document data stored in the memory 22 of the document management apparatus 10 (for example, "document-1" or the like), or folder identification information for identifying a folder in which document data is stored in the memory 22 (for example, "folder-1" or the like). The target operation is the content of an operation for corresponding document data or a corresponding folder. The required authentication-mode ID is information indicating an authentication mode to be required for the target operation. For example, for document data of the "document-1", authentication is not required for operations other than update. That is, for the document data of the "document-1", authentication is not required when operations other than update are performed. In contrast, for document data of the "document-2", authentication is required in an authentication mode 3 for an update operation. That is, when an update operation is performed on the document data of "document-2", authentication is required in the authentication mode 3. Likewise, other objects are associated with information indicating authentication modes required when operations for the objects are performed. An authentication mode required for an operation for specific document data or a specific folder is determined by referring to this object right table. The authentication mode required for each object may be set by, for example, an administrator of the object, or may also be set by a user of document data or the like. As a matter of course, the authentication modes may also be set with reference to other standards.

FIG. 7 illustrates an example of an authentication mode table. This authentication mode table is information indicating authentication modes. The authentication mode table is, for example, generated in advance and stored in the memory 22 of the document management apparatus 10.

Specifically, the authentication mode table illustrates a correspondence relationship between an authentication-mode ID, an authentication-mode name, and a data-format ID. The authentication-mode ID is authentication-mode identification information for identifying an authentication mode. The authentication-mode name is the name of an authentication mode. The data-format ID is information indicating a data format used in a corresponding authentication mode. For example, an authentication mode 1 is ID-and-password authentication, and data having a data-format ID of "0" is used in the authentication. In addition, the authentication mode 3 is face authentication, and data having a data-format ID of "2" is used in the authentication.

FIG. 8 illustrates an example of a data-format table. This data-format table is information indicating data-format names. The data-format table is, for example, generated in advance, and stored in the memory 22 of the document management apparatus 10 and the memories 32 of the image forming apparatuses 12A and 12B.

Specifically, the data-format table illustrates a correspondence relationship between a data-format ID and a data-format name. This data-format ID is an ID common for the document management apparatus 10 and the image forming apparatuses 12A and 12B. For example, the data-format ID "0" indicates a character string, and the data-format ID "2" indicates a "picture image".

A description will be made using, for example, the tables illustrated in FIGS. 6 and 7 as an example. Authentication is required in the authentication mode 3 for an operation for the "folder-1", and data having the data-format ID of "2" is used in the authentication mode 3. That is, "face authentication" using a "picture image" is required for this operation.

FIG. 9 illustrates an example of an alternative-authentication-mode table. This alternative-authentication-mode table is information indicating an alternative authentication mode as an alternative to a required authentication mode. The alternative-authentication-mode table is, for example, generated in advance and stored in the memory 22 of the document management apparatus 10.

Specifically, the alternative-authentication-mode table illustrates a correspondence relationship between an alternative-mode ID, an alternative-mode name, and an authentication-mode ID. The alternative-mode ID is information indicating an alternative authentication mode as an alternative to a required authentication mode. The alternative-mode name is the name of the alternative authentication mode. The authentication-mode ID is information indicating a required authentication mode. For example, the authentication mode 3 indicates face authentication, and an alternative mode 1 is prepared as an alternative authentication mode for the face authentication. Authentication in this alternative mode 1 is camera authentication performed at a portable terminal. In the case where an apparatus that does not support face authentication is used, it is assumed that camera authentication using a portable terminal is used instead of face authentication.

FIG. 10 illustrates an example of an authenticated-terminal table. This authenticated-terminal table is information on request devices that have transmitted use-request information to the document management apparatus 10. Use-request information is information indicating a login request to the document management apparatus 10, an operation request for document data or a folder, or the like. Every time the document management apparatus 10 receives use-request information from an apparatus other than the document management apparatus 10, the authenticated-terminal table is updated by the alternative-authentication-information generation unit 26.

Specifically, the authenticated-terminal table illustrates a correspondence relationship between a terminal ID, a last negotiation date and time, an IP address, position information, a description of an installation location, and a transmission valid data-format ID. The terminal ID is device identification information for identifying a request device that has transmitted use-request information to the document management apparatus 10 (for example, the image forming apparatus 12A, 12B, or the like). The last negotiation date and time is the latest date and time when the use-request information is transmitted. The IP address is the IP address of the request device. The position information is coordinates representing the position of the request device, and for example information indicating a latitude and a longitude. The description of the installation location is a description of a location where the request device is installed. The transmission valid data-format ID is information indicating a data format supported by the request device, and is information corresponding to a data-format ID included in the data-format table illustrated in FIG. 8. As illustrated in FIG. 7, since the data-format ID corresponds to an authentication-mode ID in the authentication mode table, it may be said that the transmission valid data-format ID is information indicating an authentication mode supported by the request device.

For example, when a device having a terminal ID of "1" is described, its last negotiation date and time is "10:10:10, Jan. 1, 2015", its IP address is "123.456.111.222", and its position (coordinates) is "XXX, YYY". In addition, the device is installed at the south on the tenth floor. Since data-format IDs valid in the device are "0" and "2", the device processes a character string (ID=0) and a picture image (ID=2). That is, the device supports ID-and-password authentication (the authentication mode 1) and face authentication (the authentication mode 3).

For example, together with use-request information, a terminal ID indicating a request device that has transmitted the use-request information, an IP address, position information, description information about an installation location, and a transmission valid data-format ID are transmitted from the request device to the document management apparatus 10. The alternative-authentication-information generation unit 26 updates the authenticated-terminal table using these pieces of information. That is, the authenticated-terminal table represents log information indicating an access log from the request device. As described later, a search for alternative devices supporting an authentication mode that is not supported by the request device is performed by using the authenticated-terminal table.

Figure 11:
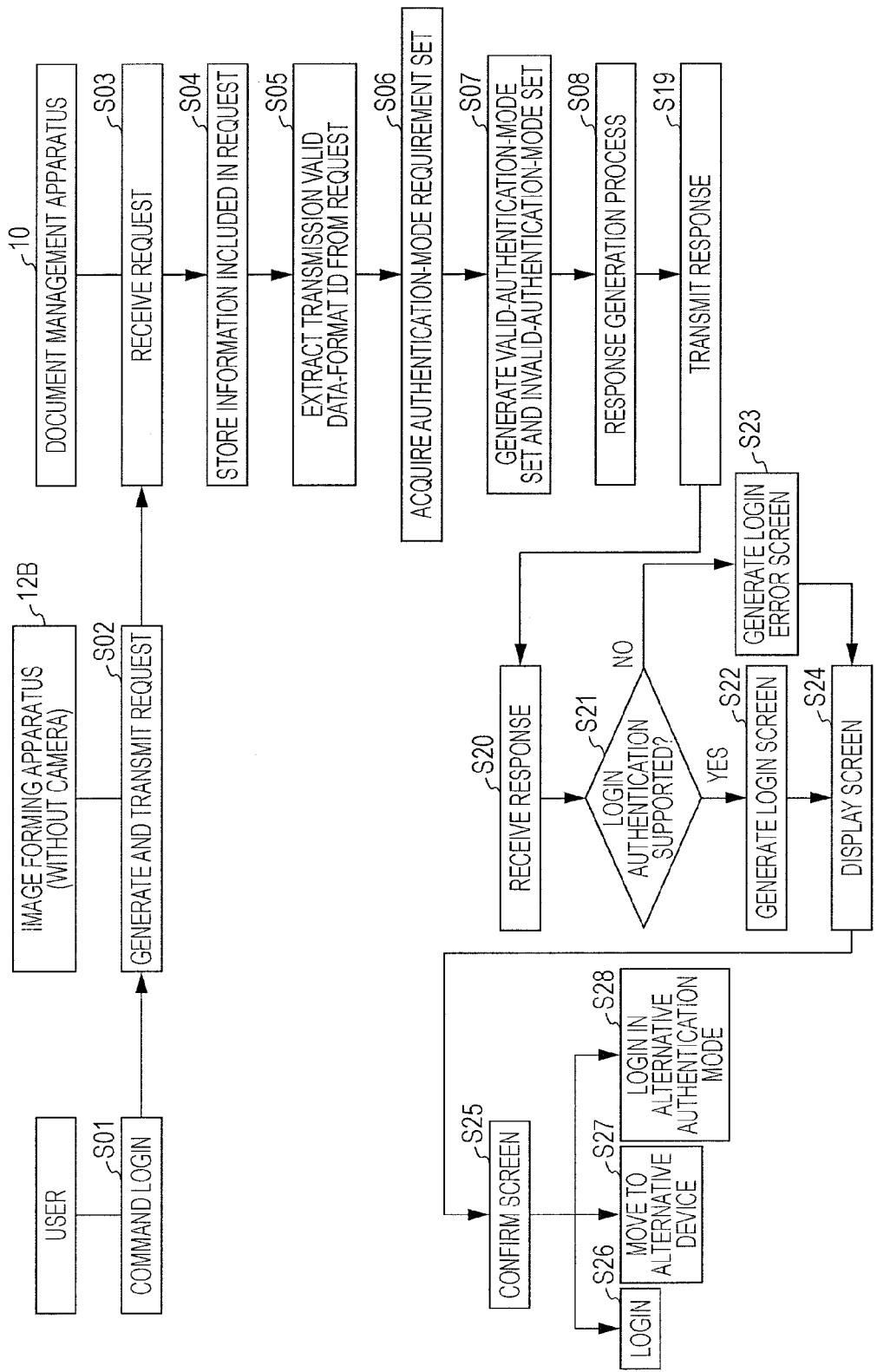
FIG. 11 is a flowchart illustrating an example of a process executed in the document management system.

In the following, a process executed by the document management system according to the present exemplary embodiment (an authentication negotiation process) will be described. FIG. 11 illustrates an example of the process. As an example, a process performed in the case where the user logs in to the document management apparatus 10 using the image forming apparatus 12B, which is not equipped with the imaging unit 36 (a camera), will be described. In this case, the image forming apparatus 12B is a request device.

First, the user commands a login to the document management apparatus 10 by using the UI unit 34 at the image forming apparatus 12B (S01). In the image forming apparatus 12B, the controller 38 generates use-request information (authentication negotiation request information) in response to the command (S02). This use-request information includes login request information for requesting a login, the terminal ID for identifying the image forming apparatus 12B, the IP address assigned to the image forming apparatus 12B, the position information about the image forming apparatus 12B (for example, information indicating a latitude and a longitude), description information on the installation location of the image forming apparatus 12B, and data-format IDs valid in the image forming apparatus 12B (transmission valid data-format IDs). Note that authentication-mode IDs valid in the image forming apparatus 12B may also be included in the use-request information instead of or together with the transmission valid data-format IDs. These pieces of information are prestored in the memory 32 of the image forming apparatus 12B. Then, the use-request information is transmitted by the communication unit 28 from the image forming apparatus 12B to the document management apparatus 10 (S02).

The use-request information transmitted from the image forming apparatus 12B is received by the communication unit 16 in the document management apparatus 10 (S03).

Next, the alternative-authentication-information generation unit 26 stores, in the memory 22, information included in the use-request information (S04). For example, the alternative-authentication-information generation unit 26 adds the information included in the use-request information to the authenticated-terminal table illustrated in FIG. 10. In the case where information on the image forming apparatus 12B has already been registered in the authenticated-terminal table, the alternative-authentication-information generation unit 26 updates the information to the information included in the newly received use-request information. As an example, when the terminal ID of the image forming apparatus 12B is "3", information corresponding to a terminal ID of 3 is registered in the authenticated-terminal table.

Next, the alternative-authentication-information generation unit 26 extracts a transmission valid data-format ID from the use-request information (S05). In addition, the alternative-authentication-information generation unit 26 acquires an authentication-mode requirement set (S06). This authentication-mode requirement set includes a login authentication-mode ID required for performing a login to the document management apparatus 10, and required authentication-mode IDs for respective operations of each object illustrated in the object right table illustrated in FIG. 6. For example, the login authentication-mode ID may be stored in the memory 22 of the document management apparatus 10 or may also be registered in the object right table. The alternative-authentication-information generation unit 26 acquires the login authentication-mode ID from the memory 22 or the object right table, and acquires required authentication-mode IDs for respective operations of each object from the object right table. As a result, an authentication-mode requirement set is generated. For example, the alternative-authentication-information generation unit 26 acquires required authentication-mode IDs of respective operations of all objects from the object right table. In this case, an authentication-mode requirement set includes required authentication-mode IDs of respective operations of all the objects.

Then, the alternative-authentication-information generation unit 26 generates a valid-authentication-mode set and an invalid-authentication-mode set by referring to the authentication mode table illustrated in FIG. 7 in accordance with the authentication-mode requirement set and the transmission valid data-format ID (S07). The valid-authentication-mode set is information indicating a set of authentication-mode IDs valid in the image forming apparatus 12B in a group of authentication-mode IDs (a group of the login authentication-mode ID and the required authentication-mode IDs) included in the authentication-mode requirement set. For example, in the case where the image forming apparatus 12B supports a certain login authentication mode, the login authentication-mode ID of the login authentication mode is included in the valid-authentication-mode set. In addition, required authentication-mode IDs for respective operations of each object that are valid in the image forming apparatus 12B are included in the valid-authentication-mode set. The invalid-authentication-mode set is information indicating a set of authentication-mode IDs invalid in the image forming apparatus 12B in the group of authentication-mode IDs included in the authentication-mode requirement set. For example, in the case where the image forming apparatus 12B does not support a certain login authentication mode, the login authentication-mode ID of the login authentication mode is included in the invalid-authentication-mode set. In addition, required authentication-mode IDs for respective operations of each object that are invalid in the image forming apparatus 12B are included in the invalid-authentication-mode set. Since data-format IDs are associated with authentication-mode IDs in the authentication mode table, an authentication-mode ID corresponding to a certain transmission valid data-format ID is specified by referring to the authentication mode table. As a result, the IDs of authentication modes supported by the image forming apparatus 12B are determined. Then, the valid-authentication-mode set and the invalid-authentication-mode set are generated by comparing the IDs of the authentication modes supported by the image forming apparatus 12B with the group of authentication-mode IDs (the group of the login authentication-mode ID and the required authentication-mode IDs) included in the authentication-mode requirement set.

As an example, suppose that the terminal ID of the image forming apparatus 12B is "3". The transmission valid data-format IDs are "0" and "1" with reference to the authenticated-terminal table illustrated in FIG. 10. In addition, the authentication-mode IDs corresponding to the data-format IDs of 0 and 1 are the authentication modes 1 and 2 with reference to the authentication mode table illustrated in FIG. 7. Thus, the image forming apparatus 12B supports the ID-and-password authentication process and the IC-card authentication process. In addition, with reference to the object right table illustrated in FIG. 6, no authentication, an authentication mode 2, and the authentication mode 3 are registered. Suppose that the login authentication-mode ID is the authentication mode 1 (the ID-and-password authentication process). In this case, an authentication-mode requirement set includes the authentication mode 1 corresponding to the login authentication mode and the authentication modes 2 and 3 corresponding to respective operations of each object. Since the image forming apparatus 12B supports the authentication modes 1 and 2, a valid-authentication-mode set includes the authentication modes 1 and 2, and an invalid-authentication-mode set includes the authentication mode 3.

The alternative-authentication-information generation unit 26 generates response information to be transmitted to the image forming apparatus 12B in accordance with the above-described valid-authentication-mode set and invalid-authentication-mode set (S08).

Figure 12:
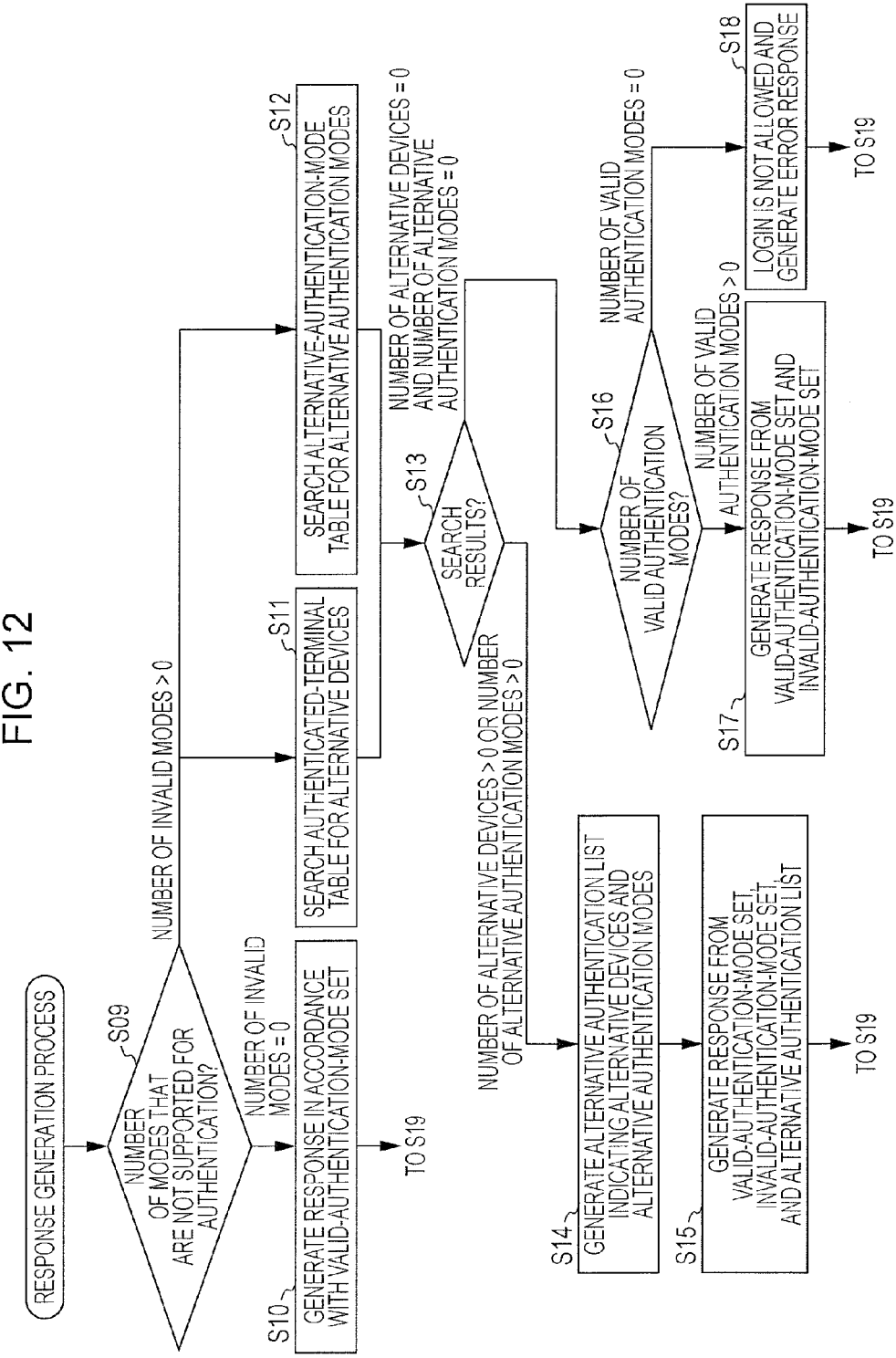
FIG. 12 is a flowchart illustrating an example of a process executed in the document management apparatus.

Here, a response generation process will be described with reference to FIG. 12.

In the case where the number of modes that are not supported for authentication is 0 (zero) (the number of invalid modes=0 in S09), the alternative-authentication-information generation unit 26 generates response information in accordance with the valid-authentication-mode set (S10). Then, the process proceeds to step S19 illustrated in FIG. 11. To be more specific, in the case where there are no authentication-mode IDs that are not supported by the image forming apparatus 12B in the group of authentication-mode IDs included in the authentication-mode requirement set, that is, in the case where no authentication-mode IDs are included in the invalid-authentication-mode set, the number of modes that are not supported for authentication is determined to be 0 (zero). In this case, the image forming apparatus 12B supports all authentication modes including the login authentication mode required for login and authentication modes required for all operations of all objects. The response information generated here includes the content of the valid-authentication-mode set (for example, pieces of supported authentication information indicating respective authentication modes (for example, authentication-mode names)). That is, the response information includes information indicating the authentication modes supported by the image forming apparatus 12B.

In contrast, in the case where the number of modes that are not supported for authentication is not 0 (zero) (the number of invalid modes >0 in S09), processing in steps S11 and S12 is executed.

In step S11, the alternative-authentication-information generation unit 26 searches the authenticated-terminal table illustrated in FIG. 10 for alternative devices. That is, the alternative-authentication-information generation unit 26 determines an alternative device corresponding to an authentication mode that is not supported by the image forming apparatus 12B by referring to the authenticated-terminal table. For example, in the case where an authentication mode that is not supported by the image forming apparatus 12B is the authentication mode 3, "face authentication", the authenticated-terminal table is searched for alternative devices supporting the "face authentication". Since the data-format ID corresponding to the authentication mode 3 is "2" with reference to the authentication mode table illustrated in FIG. 7, terminal IDs corresponding to a data-format ID of 2 are determined in the authenticated-terminal table. For example, devices having terminal IDs of "1" and "2" are determined to be alternative devices with reference to the authenticated-terminal table.

In step S12, the alternative-authentication-information generation unit 26 searches the alternative-authentication-mode table illustrated in FIG. 9 for alternative authentication modes. That is, the alternative-authentication-information generation unit 26 determines, by referring to the alternative-authentication-mode table, alternative authentication modes as alternatives to authentication modes that are not supported by the image forming apparatus 12B. For example, in the case where an authentication mode that is not supported by the image forming apparatus 12B is the authentication mode 3, "face authentication", the alternative-authentication-mode table is searched for alternative authentication modes corresponding to the "face authentication". Since the ID of an alternative authentication mode as an alternative to the authentication mode 3 is "1" with reference to the alternative-authentication-mode table illustrated in FIG. 9, camera authentication at the portable terminal is determined to be an alternative authentication mode.

Note that at least one of the processing in step S11 and the processing in step S12 may be executed. That is, only the processing in step S11 may be executed, only the processing in step S12 may be executed, or the processing in both of steps S11 and S12 may be executed.

Then, the process to be executed differs in accordance with search results obtained in steps S11 and S12. In the case where the number of alternative devices is not 0 (zero) or where the number of alternative authentication modes is not 0 (zero) (the number of alternative devices >0 or the number of alternative authentication modes >0 in S13), the process proceeds to step S14. That is, in the case where alternative devices are present or where alternative authentication modes are present, the process proceeds to step S14. In this case, the alternative-authentication-information generation unit 26 generates an alternative authentication list (S14). In the case where alternative devices are present, the alternative authentication list includes information on the alternative devices. In the case where alternative authentication modes are present, the alternative authentication list includes information on the alternative authentication modes. In addition, in the case where alternative devices and alternative authentication modes are present, the alternative authentication list includes information on the alternative devices and information on the alternative authentication modes. For example, information included in the authenticated-terminal table is used as information on an alternative device. Specifically, for example, the IP address of the alternative device, information indicating an installation location of the alternative device, and the like are used as information on the alternative device. In addition, information included in the alternative-authentication-mode table is used as information on an alternative authentication mode. Specifically, for example, an alternative-mode name, information for describing how to execute the alternative authentication mode, and the like are used as information on the alternative authentication mode.

Next, the alternative-authentication-information generation unit 26 generates response information in accordance with the valid-authentication-mode set, the invalid-authentication-mode set, and the alternative authentication list (S15). Then, the process proceeds to step S19 illustrated in FIG. 11. The response information generated here includes the content of the valid-authentication-mode set, the invalid-authentication-mode set, and the alternative authentication list.

In contrast, in the case where the number of alternative devices is 0 (zero) and the number of alternative authentication modes is 0 (zero) (the number of alternative devices=0 and the number of alternative authentication modes=0 in S13), the process proceeds to step S16. That is, in the case where neither alternative devices nor alternative authentication modes are present, the process proceeds to step S16. In this case, the process to be executed differs in accordance with the number of valid authentication modes. The number of valid authentication modes is the number of authentication modes supported by the image forming apparatus 12B in a group of authentication modes required at the document management apparatus 10. That is, the number of valid authentication modes is the number of authentication-mode IDs included in the valid-authentication-mode set. In the case where the number of valid authentication modes is not 0 (zero) (the number of valid authentication modes >0 in S16), that is, where authentication-mode IDs are included in the valid-authentication-mode set, the process proceeds to step S17. In contrast, in the case where the number of valid authentication modes is 0 (zero) (the number of valid authentication modes=0 in S16), that is, where no authentication-mode IDs are included in the valid-authentication-mode set, the process proceeds to step S18.

In step S17, the alternative-authentication-information generation unit 26 generates response information in accordance with the valid-authentication-mode set and the invalid-authentication-mode set. Then, the process proceeds to step S19 illustrated in FIG. 11. The response information generated here includes the content of the valid-authentication-mode set and the invalid-authentication-mode set.

In step S18, the alternative-authentication-information generation unit 26 generates error response information. Since the image forming apparatus 12B does not support the login authentication mode either, a login to the document management apparatus 10 is not allowed from the image forming apparatus 12B and information indicating that the login is not allowed is included in the error response information. Then, the process proceeds to step S19 illustrated in FIG. 11.

In the following, the process in and after step S19 will be described with reference to FIG. 11. When the response information or the error response information is generated as above, the response information or the error response information is transmitted from the document management apparatus 10 to the image forming apparatus 12B by the communication unit 16 (S19).

The response information or the error response information transmitted from the document management apparatus 10 is received by the communication unit 28 in the image forming apparatus 12B (S20).

Then, the controller 38 executes processing in accordance with the response information or the error response information in the image forming apparatus 12B.

In the case where the image forming apparatus 12B supports the login authentication mode or where the image forming apparatus 12B does not support the login authentication mode but alternative devices or alternative authentication modes are present (Yes in S21), the controller 38 generates information on a login screen (S22) and causes the UI unit 34 to display the login screen (S24).

The login screen displays information indicating the authentication modes supported by the image forming apparatus 12B, information indicating the authentication modes that are not supported by the image forming apparatus 12B, information on alternative devices, information on alternative authentication modes, and the like.

For example, in the case where the valid-authentication-mode set included in the response information includes a login authentication-mode ID, the image forming apparatus 12B supports the login authentication mode. In this case, the login screen displays information on the login authentication mode. For example, the login screen displays a login button for performing a login operation, and the like. In the case where the response information includes the alternative authentication list and where the alternative authentication list includes information on alternative devices supporting the login authentication mode or information on alternative authentication modes, alternative devices or alternative authentication modes are present. In this case, the login screen displays information on alternative devices or alternative authentication modes.

In contrast, in the case where the image forming apparatus 12B does not support the login authentication mode, and neither alternative devices nor alternative authentication modes are present (No in S21), the controller 38 generates information on a login error screen (S23) and causes the UI unit 34 to display the login error screen (S24). In the case where the error response information has been received, since no authentication modes supported by the image forming apparatus 12B are present, the image forming apparatus 12B does not support the login authentication mode. In addition, in the case where the valid-authentication-mode set and the alternative authentication list included in the response information do not include the login authentication-mode ID, information on alternative devices, and information on alternative authentication modes, the image forming apparatus 12B does not support the login authentication mode, and neither alternative devices nor alternative authentication modes are present. In this case, a login operation is not executed.

The screen displayed on the UI unit 34 of the image forming apparatus 12B is confirmed by the user (S25), and the following operations are performed. In the case where the login error screen is displayed, login is prohibited and the following operations are prohibited. In the case where the login screen is displayed, it is assumed that the user performs operations in accordance with the login screen.

In the case where the image forming apparatus 12B supports the login authentication mode, the user performs a login operation using the UI unit 34 of the image forming apparatus 12B in accordance with information displayed on the login screen (S26). For example, in the case where an authentication mode required for login is ID-and-password authentication, and the image forming apparatus 12B supports the authentication mode, the user inputs an ID and a password by operating the UI unit 34 of the image forming apparatus 12B. The authentication information input here (the ID and the password) is transmitted from the image forming apparatus 12B to the document management apparatus 10, and the authentication unit 18 of the document management apparatus 10 performs an authentication process. In the case where authentication has been successful, a login from the image forming apparatus 12B to the document management apparatus 10 is allowed. In the case where authentication has failed, a login from the image forming apparatus 12B to the document management apparatus 10 is prohibited.

In addition, in the case where the image forming apparatus 12B does not support the login authentication mode, and an alternative device is present, a login operation is performed using the alternative device (S27). For example, the login screen displays information on the alternative device. It is assumed that the user moves to the alternative device with reference to the information, and performs a login operation at the alternative device. For example, in the case where an authentication mode required for login is face authentication and the image forming apparatus 12B does not support the authentication mode, the login screen displays information on an alternative device. In the case where the image forming apparatus 12A supports a face authentication mode, the UI unit 34 of the image forming apparatus 12B (the login screen) displays information on the image forming apparatus 12A. In this case, the user moves to the image forming apparatus 12A, and performs a login operation using the image forming apparatus 12A.

In addition, in the case where the image forming apparatus 12B does not support the login authentication mode, and an alternative authentication mode is present, a login operation is performed using the alternative authentication mode (S28). For example, the login screen displays information on the alternative authentication mode. For example, in the case where an authentication mode required for login is face authentication, and the image forming apparatus 12B does not support the authentication mode, the UI unit 34 of the image forming apparatus 12B (the login screen) displays information on the alternative authentication mode. In this case, the user executes a login operation by performing operations valid in the alternative authentication mode.

As described above, in the case where the image forming apparatus 12B supports the login authentication mode, a login operation is performed at the image forming apparatus 12B. In contrast, in the case where the image forming apparatus 12B does not support the login authentication mode, and an alternative device or an alternative authentication mode is present, information on the alternative device or the alternative authentication mode is displayed at the image forming apparatus 12B. As a result, information on an alternative device supporting a required authentication mode or an alternative authentication mode is presented to the user. Thus, even in the case where the image forming apparatus 12B used by the user does not support the login authentication mode, a login operation is executed by using an alternative device or an alternative authentication mode.

Figure 13:
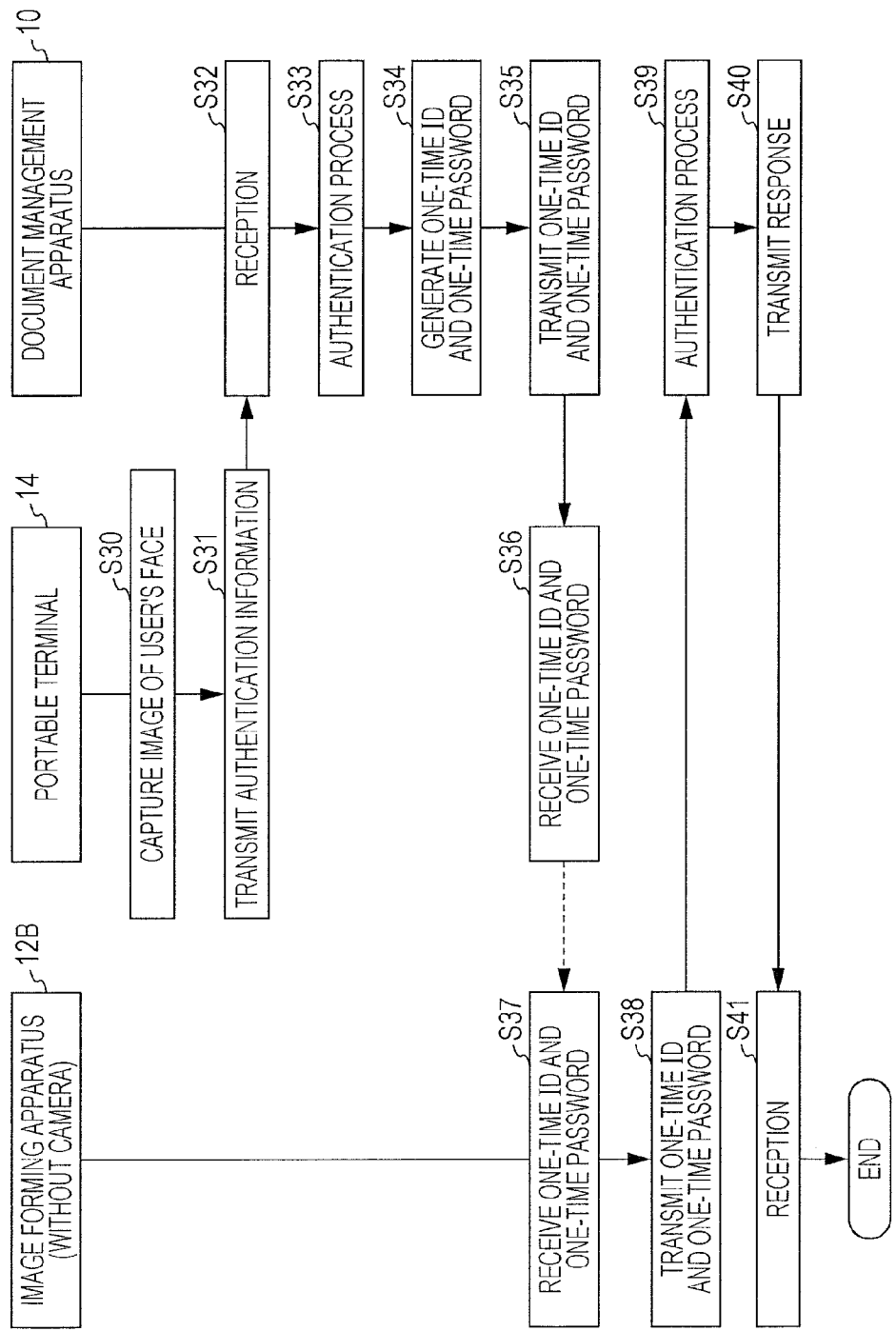
FIG. 13 is a flowchart illustrating an example of an alternative face authentication process.

Next, an authentication process for an alternative authentication mode will be described with reference to FIG. 13. For example, suppose that the image forming apparatus 12B, which is not equipped with the imaging unit 36, is used, and an authentication mode required for a target operation (for example, login or an operation for document data) is face authentication. According to the alternative-authentication-mode table illustrated in FIG. 9, camera authentication performed at a portable terminal is prepared as an alternative authentication mode for face authentication. Here, an authentication process for the alternative authentication mode is executed using the portable terminal 14.

As a precondition for execution of camera authentication, a terminal ID of the portable terminal 14 and face image data representing the user's face are preregistered in the document management apparatus 10. For example, face image data obtained by the imaging unit 42 of the portable terminal 14 or another imaging device and the terminal ID of the portable terminal 14 are transmitted from a device such as the portable terminal 14 to the document management apparatus 10, and are associated with each other and stored in the memory 22 of the document management apparatus 10. As a result, preregistration is completed.

In the case where an alternative authentication process is executed, the user captures an image of their face using the imaging unit 42 of the portable terminal 14, which has been registered (S30). As a result, face image data is generated. Next, authentication information including the terminal ID of the portable terminal 14 and the face image data is transmitted from the portable terminal 14 to the document management apparatus 10 (S31).

The authentication information transmitted from the portable terminal 14 is received by the document management apparatus 10 (S32). Next, an authentication process is executed by the authentication unit 18 of the document management apparatus 10 (S33). In the authentication process, the terminal ID and the face image data included in the authentication information are compared with preregistered information (the terminal ID and the face image data) stored in the memory 22 of the document management apparatus 10. In the case where preregistered information that agrees with the authentication information is stored in the memory 22 (for example, in the case where preregistered information that matches the authentication information is stored in the memory 22), the authentication unit 18 generates temporary authentication information including a one-time ID and a one-time password (S34). This temporary authentication information is temporarily stored in the authentication unit 18. The temporary authentication information is transmitted from the document management apparatus 10 to the portable terminal 14 (S35). In contrast, in the case where preregistered information that agrees with the authentication information is not stored in the memory 22, temporary authentication information is not generated.

The temporary authentication information transmitted from the document management apparatus 10 is received by the portable terminal 14 (S36), and is displayed on the UI unit 44 of the portable terminal 14. The user inputs the one-time ID and the one-time password using the UI unit 34 of the image forming apparatus 12B. Upon receiving the one-time ID and the one-time password (S37), the image forming apparatus 12B transmits the one-time ID and the one-time password to the document management apparatus 10 (S38).

The authentication unit 18 of the document management apparatus 10 performs an authentication process using the stored temporary authentication information and the temporary authentication information transmitted from the portable terminal 14 (S39). In the case where the stored temporary authentication information agrees with the temporary authentication information transmitted from the portable terminal 14, and authentication has been successful (for example, in the case where the stored temporary authentication information matches the temporary authentication information transmitted from the portable terminal 14), response information is generated at the document management apparatus 10, and the response information is transmitted to the image forming apparatus 12B (S40). The response information transmitted from the document management apparatus 10 is received by the image forming apparatus 12B (S41). As a result, a target operation (for example, login or an operation for document data) is allowed. In contrast, in the case where the stored temporary authentication information does not agree with the temporary authentication information transmitted from the portable terminal 14, and authentication has been failed (for example, in the case where the stored temporary authentication information does not match the temporary authentication information transmitted from the portable terminal 14), the target operation is prohibited.

With the above-described process, even in the case where the image forming apparatus 12B does not support a face authentication mode, an authentication process is performed by using an alternative authentication mode instead of the face authentication mode.

In addition, the authentication information transmitted in step S31 may also include image-capturing date-and-time information indicating an image-capturing date and time for the face image data. In this case, the authentication unit 18 of the document management apparatus 10 compares a reception date and time of reception of the authentication information including the face image data with the image-capturing date and time indicated by the image-capturing date-and-time information included in the authentication information. Then, in the case where the terminal ID and the face image data included in the authentication information transmitted from the portable terminal 14 are registered in the document management apparatus 10, and the image-capturing date and time is within a preset time (for example, within five minutes) with respect to the reception date and time, a one-time ID and a one-time password are generated and transmitted to the portable terminal 14. In contrast, in the case where the image-capturing date and time is not included in the preset time with respect to the reception date and time, no one-time ID and no one-time password are generated.

As another example, position information about the portable terminal 14 may also be used in the authentication process in step S33. In this case, the position information about the portable terminal 14 is included in the authentication information transmitted from the portable terminal 14. For example, the portable terminal 14 equipped with a Global Positioning System (GPS) is used, and the position information about the portable terminal 14 is acquired using the GPS function. The authentication unit 18 of the document management apparatus 10 acquires the position information about the image forming apparatus 12B from the authenticated-terminal table, and compares the position information about the image forming apparatus 12B with the position information about the portable terminal 14 included in the authentication information. In the case where the terminal ID and the face image data included in the authentication information has been registered in the document management apparatus 10, and the positional relationship between the image forming apparatus 12B and the portable terminal 14 satisfies a preset standard, a one-time ID and a one-time password are generated and transmitted to the portable terminal 14. For example, in the case where the distance between the image forming apparatus 12B and the portable terminal 14 is less than or equal to a certain threshold (for example, a few meters), a one-time ID and a one-time password are generated and transmitted to the portable terminal 14. In contrast, in the case where the positional relationship does not satisfy the standard (for example, in the case where the distance between the image forming apparatus 12B and the portable terminal 14 exceeds the threshold), no one-time ID and no one-time password are generated. Note that the authentication process may also be performed using a combination of the image-capturing date-and-time information and the position information.

Figure 14:
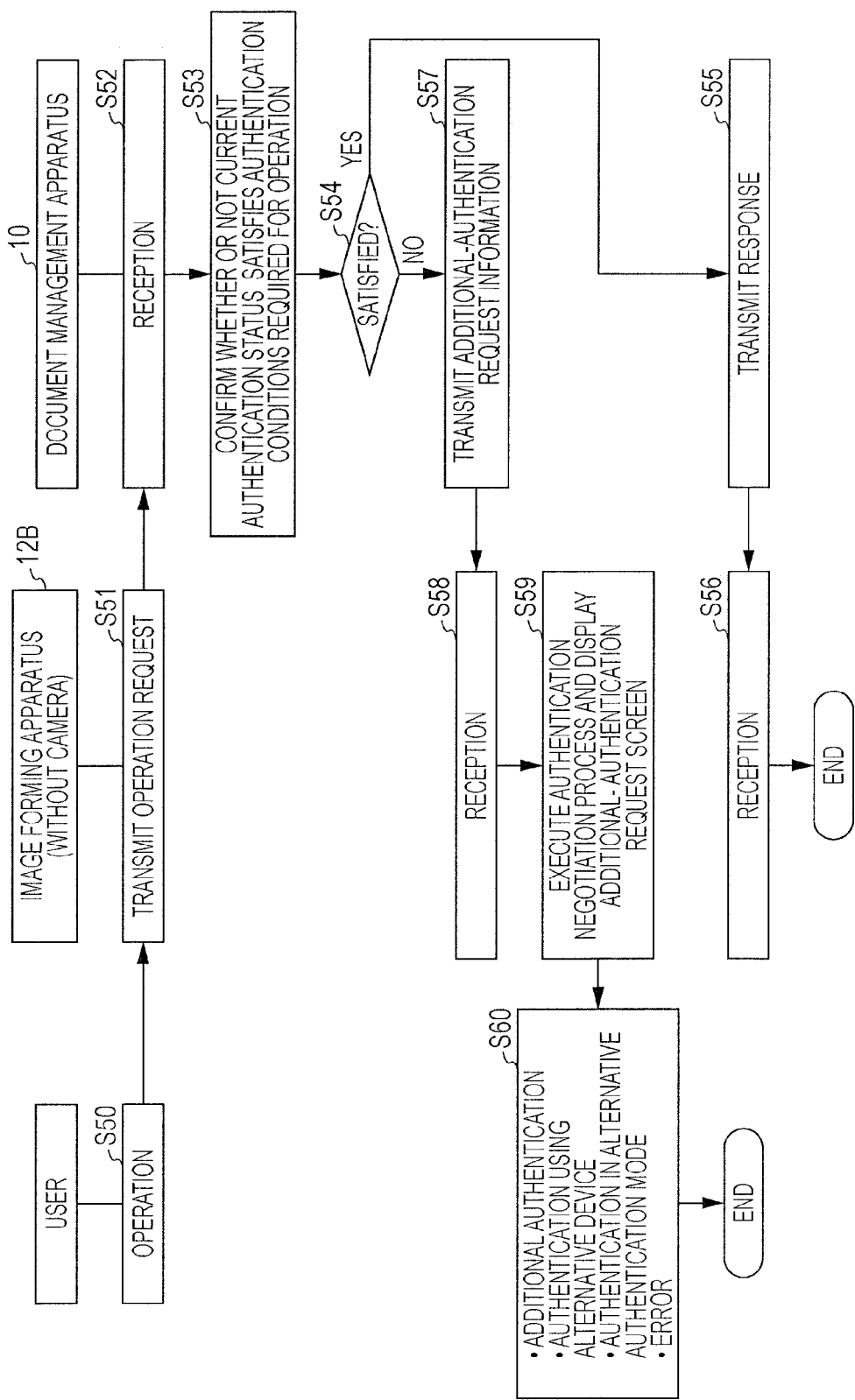
FIG. 14 is a flowchart illustrating an example of an additional-authentication process.

Next, operations after login will be described. Even after a login has been performed to the document management apparatus 10, there may be the case where authentication is required for performing an operation depending on an object (document data or a folder). For example, as illustrated in FIG. 6, authentication is required in the authentication mode 3 for operations for the "folder-1". FIG. 14 illustrates an example of a process for the authentication (additional authentication). In the following, the additional authentication will be described with reference to FIG. 14. As an example, suppose that the image forming apparatus 12B, which is not equipped with the imaging unit 36, is used.

First, the user executes a specific operation by using the UI unit 34 at the image forming apparatus 12B (S50). For example, an operation for document data or a folder stored in the document management apparatus 10 (for example, access) is performed. When the user executes the operation, operation request information indicating the content of the operation is transmitted to the document management apparatus 10 by the communication unit 28 of the image forming apparatus 12B (S51).

The operation request information transmitted from the image forming apparatus 12B is received by the communication unit 16 in the document management apparatus 10 (S52).

Next, the authentication unit 18 of the document management apparatus 10 confirms, with reference to the operation request information, whether or not a current authentication status of the image forming apparatus 12B satisfies authentication conditions required for the operation (S53). The object right table illustrated in FIG. 6 illustrates authentication modes required for respective operations for each object, and thus the authentication mode required for the operation is determined by referring to the object right table. In addition, the current authentication status of the image forming apparatus 12B is determined.

In the case where the current authentication status satisfies the authentication condition required for the operation (Yes in S54), the operation is allowed. In this case, response information is generated by the controller 24, and the response information is transmitted to the image forming apparatus 12B by the communication unit 16 (S55). The response information is received by the image forming apparatus 12B (S56), and operations from the image forming apparatus 12B are allowed. For example, access to and update of specific document data or a specific folder are allowed.

For example, suppose that a login has been performed through ID-and-password authentication to the document management apparatus 10 using the image forming apparatus 12B. That is, the current authentication status is an ID-and-password authenticated status. In addition, suppose that no authentication modes required for the operation are present. That is, authentication is not required for the operation. For example, no authentication modes are present for operations for the "document-3", and authentication is not required for operations for the "document-3" according to the object right table. In the case where operations executed by the user are operations for the "document-3", the current authentication status satisfies the authentication condition required for the operation, and operations for the "document-3" are allowed at the image forming apparatus 12B.

In contrast, in the case where the current authentication status does not satisfy the authentication condition required for the operation (No in S54), an additional-authentication process is executed. In this case, additional-authentication request information is generated by the controller 24, and the additional-authentication request information is transmitted to the image forming apparatus 12B by the communication unit 16 (S57). The additional-authentication request information is received by the image forming apparatus 12B (S58), and an additional authentication negotiation process is executed between the image forming apparatus 12B and the document management apparatus 10 (S59). That is, the authentication negotiation process described with reference to FIGS. 11 and 12 is executed. As a result, a valid-authentication-mode set and an invalid-authentication-mode set are generated in the document management apparatus 10 in accordance with whether or not the image forming apparatus 12B supports an authentication mode required for the operation. In addition, in the case where an alternative device supporting the authentication mode is present or where an alternative authentication mode is present as an alternative to the authentication mode, an alternative authentication list including information on the alternative device or the alternative authentication mode is generated. Then, response information is generated in the document management apparatus 10 in accordance with the valid-authentication-mode set, the invalid-authentication-mode set, and the alternative authentication list, and the response information is transmitted to the image forming apparatus 12B. Information on an additional-authentication request screen is generated in the image forming apparatus 12B in accordance with the response information, and the additional-authentication request screen is displayed at the image forming apparatus 12B.

For example, suppose that a login has been performed through ID-and-password authentication to the document management apparatus 10 using the image forming apparatus 12B. In addition, suppose that an authentication mode required for the operation is face authentication. For example, the authentication mode 3 is associated with operations for the "folder-1", and face authentication is required for the operations according to the object right table. In the case where an operation executed by the user is an operation for the "folder-1", the current authentication status does not satisfy the authentication condition required for the operation. In this case, the authentication negotiation process in step S59 is executed, and an additional-authentication request screen is displayed at the image forming apparatus 12B.

In the case where the image forming apparatus 12B does not support an authentication mode required for a target operation, an additional-authentication request screen displays information indicating the authentication mode required for the target operation, information indicating alternative devices, information indicating alternative authentication modes, and the like. In the case where the image forming apparatus 12B supports the authentication mode required for the target operation, an additional-authentication request screen displays information for executing an authentication process for the authentication mode (for example, an authentication execution button, and the like).

In step S60, processing is performed in accordance with the above-described additional-authentication request screen (S60). In the case where the image forming apparatus 12B supports the authentication mode required for the operation, additional authentication is executed in the authentication mode. In the case where authentication has been successful, the operation is allowed. In the case where an alternative device is present, additional authentication is executed by the alternative device. In the case where authentication has been successful, the operation is allowed. In the case where an alternative authentication mode is present, an authentication process for the alternative authentication mode is executed. In the case where authentication has been successful, the operation is allowed. In contrast, in the case where the image forming apparatus 12B does not support the authentication mode required for the operation, and neither alternative devices nor alternative authentication modes are present, an error is received. In this case, the operation is prohibited.

As described above, in the case where the image forming apparatus 12B supports the authentication mode required for the target operation, an authentication process for the authentication mode is performed at the image forming apparatus 12B. In contrast, in the case where the image forming apparatus 12B does not support the authentication mode, and an alternative device supporting the authentication mode or an alternative authentication mode is present, information on the alternative device or the alternative authentication mode is displayed at the image forming apparatus 12B. As a result, the information on the alternative device supporting the authentication mode required for the target operation or the alternative authentication mode is presented to the user. Thus, even in the case where the image forming apparatus 12B used by the user does not support the required authentication mode, a target operation is executed by using an alternative device or an alternative authentication mode.

In addition, in the case where the additional-authentication process is executed, that is, where the current authentication status does not satisfy the authentication condition required for the operation, the controller 24 of the document management apparatus 10 may associate information on the last screen displayed at the moment at the image forming apparatus 12B (for example, a Uniform Resource Locator (URL) or the like) with the authentication information (for example, the user ID or the like), and may store the information on the last screen and the authentication information in the memory 22. Then, in the case where the authentication process has been successful using an alternative device (for example, the image forming apparatus 12A), the controller 24 transmits the information on the last screen stored in the memory 22 to the alternative device (for example, the image forming apparatus 12A). In this case, the above-described last screen is displayed on the UI unit 34 of the image forming apparatus 12A serving as the alternative device in accordance with the information on the last screen. Note that in the case where authentication has been successful using the alternative device, either an initial screen or the last screen may be displayed in accordance with selection performed by the user may be displayed at the alternative device.

Next, a screen displayed at the image forming apparatus 12B with the above-described process will be described.

Figure 15:
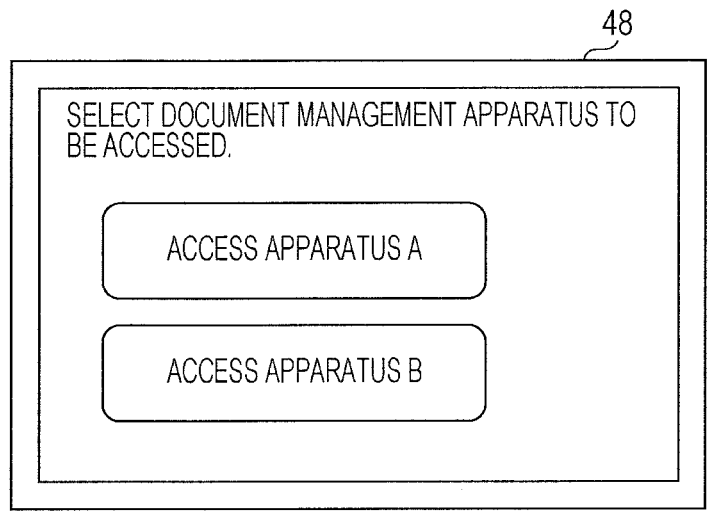
FIG. 15 is a diagram illustrating an example of a screen of the image forming apparatus.

FIG. 15 illustrates an example of an initial screen. An initial screen 48 is a screen displayed on the UI unit 34 of the image forming apparatus 12B at the time of login. The initial screen 48 displays a list of document management apparatuses 10 connected to the communication path N. For example, in the case where two document management apparatuses 10 (apparatuses A and B) are connected to the communication path N, a list of the document management apparatuses 10 is displayed. A document management apparatus 10 selected by the user from this list is accessed. For example, in the case where the apparatus A has been selected, the image forming apparatus 12B transmits use-request information to the apparatus A (the document management apparatus 10). Then, the process described with reference to FIGS. 11 and 12 (the authentication negotiation process) is executed, and a login screen is displayed on the UI unit 34 of the image forming apparatus 12B.

Figure 16:
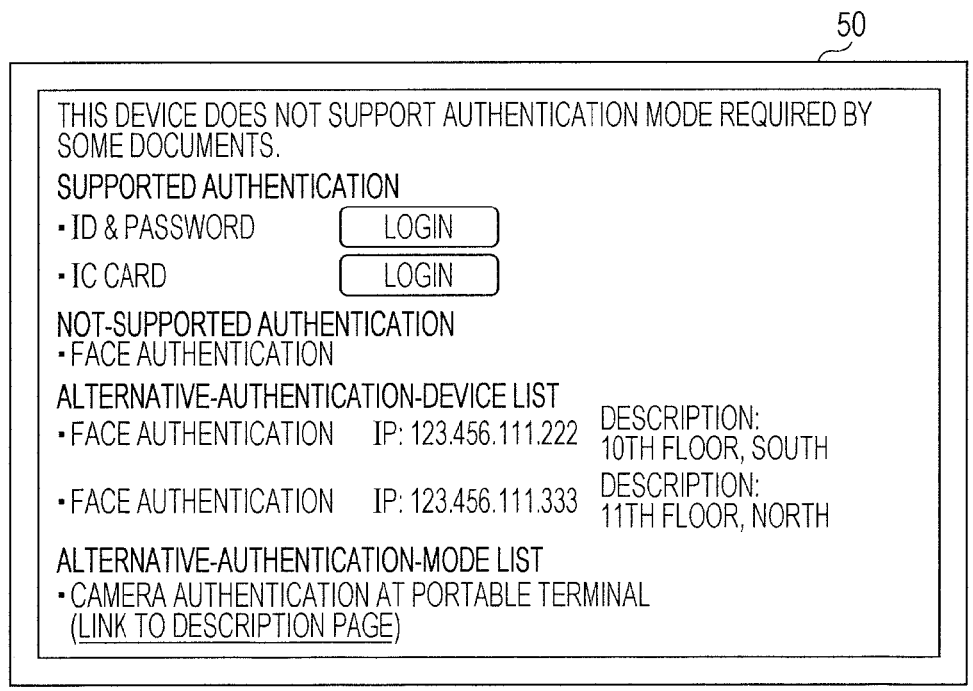
FIG. 16 is a diagram illustrating an example of a screen of the image forming apparatus.

FIG. 16 illustrates an example of the login screen. A login screen 50 is a screen displayed on the UI unit 34 of the image forming apparatus 12B in step S24 of FIG. 11. The login screen 50 displays "supported authentication", "not-supported authentication", an "alternative-authentication-device list", and an "alternative-authentication-mode list".

The "supported authentication" indicates authentication modes supported by the image forming apparatus 12B in the group of authentication modes set in the document management apparatus 10, and are authentication modes included in a valid-authentication-mode set. In the case where response information includes the valid-authentication-mode set, a list of authentication modes included in the valid-authentication-mode set is displayed on the login screen 50. For example, in the case where the image forming apparatus 12B supports "ID-and-password authentication" and "IC-card authentication", information indicating "ID-and-password authentication" and information indicating "IC-card authentication" are displayed on the login screen 50. In addition, in the example illustrated in FIG. 16, "ID-and-password authentication" and "IC-card authentication" are login authentication modes required for login. The image forming apparatus 12B supports the login authentication modes in this example. In this case, it is assumed that processing in step S26 of FIG. 11 is executed, and a login to the document management apparatus 10 is performed from the image forming apparatus 12B.

The "not-supported authentication" indicates authentication modes that the image forming apparatus 12B does not support in the group of authentication modes set in the document management apparatus 10, and are authentication modes included in an invalid-authentication-mode set. In the case where the response information includes the invalid-authentication-mode set, a list of authentication modes included in the invalid-authentication-mode set is displayed on the login screen 50. For example, in the case where the image forming apparatus 12B does not support "face authentication", information indicating "face authentication" is displayed on the login screen 50.

The "alternative-authentication-device list" is a list of alternative devices supporting authentication modes that the image forming apparatus 12B does not support, and is a list of information on the alternative devices included in the alternative authentication list. In the case where the response information includes the alternative authentication list, the information on the alternative devices included in the alternative authentication list is displayed on the login screen 50. For example, in the case where the image forming apparatus 12B does not support "face authentication", information on alternative devices that support "face authentication" is displayed on the login screen 50. As an example, the IP addresses of the alternative devices and information on installation locations of the alternative devices are displayed.

The order in which the alternative devices are displayed may be changed in accordance with the positional relationship between the image forming apparatus 12B and the alternative devices. For example, the alternative-authentication-information generation unit 26 determines the positional relationship between the image forming apparatus 12B serving as the request device and the alternative devices by using the position information managed using the authenticated-terminal table illustrated in FIG. 10. The closer the alternative device to the image forming apparatus 12B, the higher the imaging order is given by the alternative-authentication-information generation unit 26. The closer the alternative device to the image forming apparatus 12B, the higher portion on the login screen 50 displays information on the alternative device. As a result, the closer the alternative device to the image forming apparatus 12B, the more easily observable portion on the login screen 50 for the user displays the information on the alternative device.

As another example, the order in which the alternative devices are displayed may be changed in accordance with whether or not the alternative devices are included in the same subnet as the image forming apparatus 12B. For example, the alternative-authentication-information generation unit 26 gives high imaging orders to the alternative devices included in the same subnet as the image forming apparatus 12B by using IP addresses managed using the authenticated-terminal table illustrated in FIG. 10. The higher portion on the login screen 50 displays the alternative devices included in the same subnet as the image forming apparatus 12B. As a result, the alternative devices included in the same subnet as the image forming apparatus 12B are displayed at a position easily observable for the user.

As another example, the order in which the alternative devices are displayed may be changed with reference to the last negotiation dates and times. For example, the later the alternative device's last negotiation date and time, the higher the imaging order the alternative-authentication-information generation unit 26 gives by referring to the last negotiation dates and times managed using the authenticated-terminal table illustrated in FIG. 10. The later the alternative device's last negotiation date and time, the higher portion on the login screen 50 displays the alternative device. As a result, alternative devices that are not operating or assumed to be discarded are displayed on the bottom portion of the login screen 50.

The "alternative-authentication-mode list" is a list of alternative authentication modes as alternatives to authentication modes that the image forming apparatus 12B does not support, and is a list of information on alternative authentication modes included in the alternative authentication list. In the case where the response information does not include the alternative authentication list, the information on the alternative authentication modes included in the alternative authentication list is displayed on the login screen 50. For example, in the case where the image forming apparatus 12B does not support "face authentication", information on alternative authentication modes as alternatives to "face authentication" is displayed on the login screen 50. As an example, information indicating "camera authentication at a portable terminal" is displayed as information on an alternative authentication mode is displayed. In addition, a link button to a description page may also be set. This description page is a page describing how to use an alternative authentication mode. This link button is associated with, for example, link information such as a URL. When the link button is pressed down, the image forming apparatus 12B accesses the destination pointed to by the link button, and a description page is displayed on the UI unit 34 of the image forming apparatus 12B.

In addition, the login screen 50 displays information indicating that the image forming apparatus 12B (device) does not support authentication modes required by some documents. This indicates that the number of modes that are not supported for authentication is not 0 (zero) (the number of invalid modes >0). In contrast, since "supported authentication" is displayed as described above, authentication modes supported by the image forming apparatus 12B are present in the group of authentication modes set in the document management apparatus 10. In addition, alternative devices and alternative authentication modes are present. With these pieces of information being displayed, the user determines the presence of document data and folders in the document management apparatus 10 that are not allowed to use (operate) in any of the authentication modes supported by the image forming apparatus 12B. In addition, authentication modes required to use (operate) the document data and the folders, alternative devices supporting the authentication modes, and alternative authentication modes are provided to the user.

Figure 17:
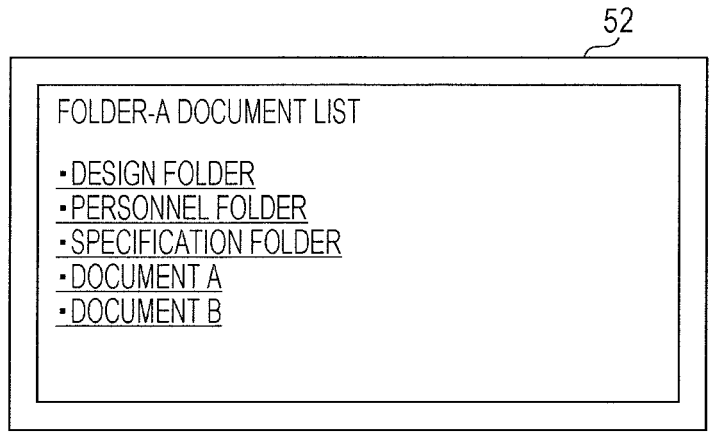
FIG. 17 is a diagram illustrating an example of the screen of the image forming apparatus.

Next, a screen after login will be described. FIG. 17 illustrates a screen 52 displaying the content of a folder A. As an example, a login to the document management apparatus 10 has been performed from the image forming apparatus 12B, which is not equipped with the imaging unit 36, by performing an authentication process (a login process) using an ID and a password. Suppose that, after the login, the folder A has been selected from among a group of folders stored in the document management apparatus 10. For example, a design folder, a personnel folder, a specification folder, a document A, and a document B are stored in the folder A.

Here, suppose that the user has specified the personnel folder. In addition, suppose that face authentication, which corresponds to the authentication mode 3, is required to operate this personnel folder.

Figure 18:
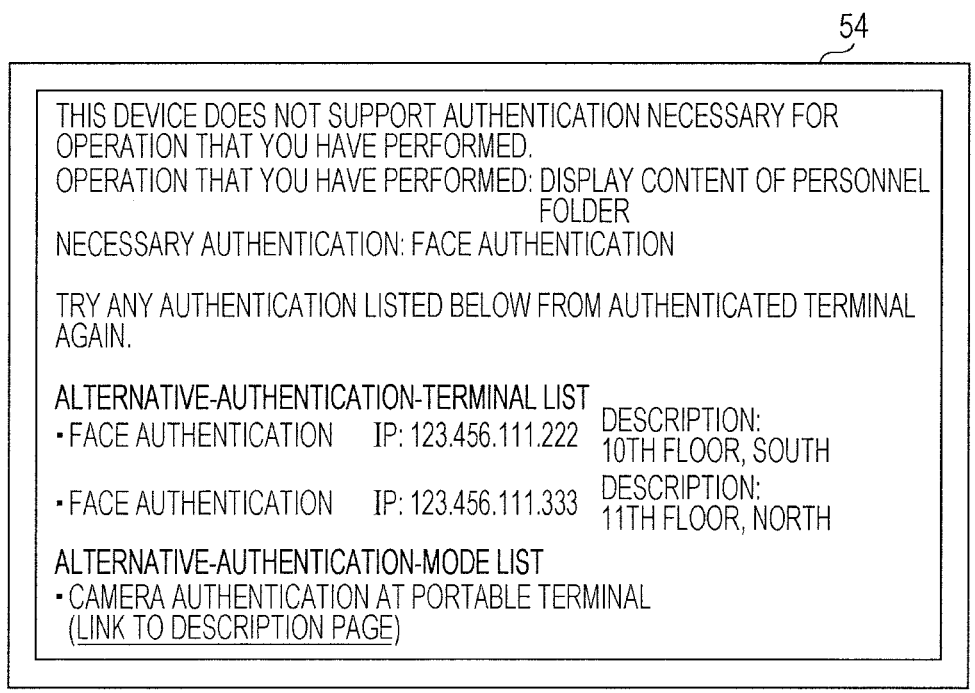
FIG. 18 is a diagram illustrating an example of the screen of the image forming apparatus.

FIG. 18 illustrates an example of an additional-authentication request screen. An additional-authentication request screen 54 is a screen displayed on the UI unit 34 of the image forming apparatus 12B in response to specification of the personnel folder described above, and is a screen generated and displayed in step S59 of FIG. 14. That is, the additional-authentication request screen 54 is a screen displayed as a result of execution of the additional authentication negotiation process.

As an example, suppose that the image forming apparatus 12B does not support face authentication. In this case, the additional-authentication request screen 54 displays information indicating that authentication necessary for an executed operation is not supported, information indicating the content of the executed operation (for example, "display content of personnel folder"), and information indicating authentication necessary for the operation (for example, "face authentication"). In addition, in the case where alternative devices supporting face authentication are present, an "alternative-authentication-device list" is displayed. In the case where alternative authentication modes are present as alternatives to face authentication, an "alternative-authentication-mode list" is displayed. In this manner, an authentication mode necessary to use (operate) the personnel folder, alternative devices supporting the authentication mode, and alternative authentication modes are provided to the user.

As described with reference to FIG. 16, the order in which the alternative devices are displayed may be changed in accordance with the positional relationship between the image forming apparatus 12B and the alternative devices in the alternative-authentication-device list. As another example, the order in which the alternative devices are displayed may be changed in accordance with whether or not the alternative devices are included in the same subnet as the image forming apparatus 12B, and the order in which the alternative devices are displayed may also be changed with reference to the last negotiation dates and times.

For example, when face authentication is executed using an alternative device and is successful, the content of the personnel folder is displayed on the UI unit 34 of the image forming apparatus 12B. In addition, when an authentication process for an alternative authentication mode is executed and is successful, the content of the personnel folder is displayed.

In the case where the image forming apparatus 12B supports an authentication mode required to operate the personnel folder, information for execution of an authentication process for the authentication mode is displayed on the additional-authentication request screen 54. For example, in the case where face authentication is required, information prompting the user to execute face authentication is displayed. Then, face authentication is executed using the image forming apparatus 12B. When face authentication is successful, the content of the personnel folder is displayed on the UI unit 34 of the image forming apparatus 12B.

In addition, in the case where the additional-authentication process is executed, information on the screen 52 (for example, a URL) illustrated in FIG. 17 may be stored in the memory 22 of the document management apparatus 10. In this case, when an authentication process using an alternative device is successful, the screen 52 is displayed on the UI unit 34 of the alternative device.

In the above-described exemplary embodiment, face authentication has been described as an example of biometric authentication; however, other biometric authentication may also be used. For example, a voice authentication process, a fingerprint authentication process, a vein authentication process, and so forth may also be used. For example, an image forming apparatus having the function of acquiring data to be used in these processes may be used as an alternative device, or an alternative authentication mode using a portable terminal having the function may be applied.

Note that in the above-described exemplary embodiment, an image forming apparatus has been described as a terminal apparatus serving as an authentication target; however, apparatuses other than image forming apparatuses may also be authentication targets.

In addition, the authentication unit 18 may be included in an apparatus other than the document management apparatus 10, for example, in an authentication server. In this case, an authentication process is executed by the apparatus such as the authentication server, and an authentication result is transmitted from the apparatus such as the authentication server to the document management apparatus 10. The document management apparatus 10 executes processing based on the authentication result.

The above-described document management apparatus 10, the image forming apparatuses 12A and 12B, and the portable terminal 14 are, for example, realized by a combination of hardware resources and software. Specifically, these apparatuses are equipped with unillustrated processors such as CPUs. The functions of the units of these apparatuses are realized by the processors reading out and executing programs stored in unillustrated storage devices. The above-described programs are stored in the storage devices via a recording medium such as a CD or a DVD or via a communication path such as a network. Alternatively, the units of these apparatuses may also be realized by, for example, hardware resources such as processors and electronic circuits. Devices such as a memory and the like may also be used to realize the units of these apparatuses. As another example, each unit may also be realized by a digital signal processor (DSP), a field-programmable gate array (FPGA), or the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to:
        specify an authentication mode from a plurality of authentication modes supported by a document management apparatus;
        acquire information indicating an authentication mode supported by a first terminal apparatus; and
        perform, in response to determining the authentication mode indicated by the acquired information does not match the specified authentication mode, control of outputting to the first terminal apparatus information on a second terminal apparatus that supports the specified authentication mode.

2. The information processing apparatus according to claim 1, further comprising:
    a memory that stores, in response to a request for use, the information indicating the authentication mode acquired from the first terminal apparatus,
    wherein the processor determines the second terminal apparatus in accordance with information stored in the memory.

3. The information processing apparatus according to claim 2, wherein the processor is further configured to:
    acquire position information of the first terminal apparatus and the second terminal apparatus; and
    perform control such that the outputted information on the second terminal apparatus is varied in accordance with the position information of the first terminal apparatus and the position information of the second terminal apparatus.

4. The information processing apparatus according to claim 3, further comprising:
    a display information memory that stores information displayed at the first terminal apparatus at a time of a request for use,
    wherein the processor is configured to perform, in a case where authentication has been successful in accordance with the determined authentication mode in the second terminal apparatus, control such that the display information stored in the display information memory is displayed at the second terminal apparatus.

5. The information processing apparatus according to claim 2, further comprising:
    a display information memory that stores information displayed at the first terminal apparatus at a time of a request for use,
    wherein the processor is configured to perform, in a case where authentication has been successful in accordance with the determined authentication mode in the second terminal apparatus, control such that the display information stored in the display information memory is displayed at the second terminal apparatus.

6. The information processing apparatus according to claim 1, wherein the processor is further configured to:
    acquire position information of the first terminal apparatus and the second terminal apparatus; and
    perform control such that the outputted information on the second terminal apparatus is varied in accordance with the position information of the first terminal apparatus and the position information of the second terminal apparatus.

7. The information processing apparatus according to claim 6, further comprising:
    a display information memory that stores information displayed at the first terminal apparatus at a time of a request for use,
    wherein the processor is configured to perform, in a case where authentication has been successful in accordance with the determined authentication mode in the second terminal apparatus, control such that the display information stored in the display information memory is displayed at the second terminal apparatus.

8. The information processing apparatus according to claim 1, further comprising:
    a display information memory that stores information displayed at the first terminal apparatus at a time of a request for use,
    wherein the processor is configured to perform, in a case where authentication has been successful in accordance with the determined authentication mode in the second terminal apparatus, control such that the display information stored in the display information memory is displayed at the second terminal apparatus.

9. The information processing apparatus according to claim 1, wherein each of the information processing apparatus, the first terminal apparatus and the second terminal apparatus are separate devices connected by a network.

10. An information processing apparatus comprising:
    a processor configured to:

receive a request for a use of data which is managed from a first terminal apparatus;

perform, in a case that the first terminal apparatus does not match an authentication mode necessary for the use; and control an output of information to the first terminal apparatus and about a second terminal apparatus that supports the authentication mode.

11. The information processing apparatus according to claim 10, wherein the first terminal apparatus and the second terminal apparatus are separate devices connected via a network.

12. The information processing apparatus according to claim 10, wherein the information indicates alternative devices that support at least ones of authentication modes, including the authentication mode.

13. The information processing apparatus according to claim 10, wherein the authentication mode comprises facial authentication.

14. The information processing apparatus according to claim 10, wherein the authentication mode comprises a fingerprint authentication.

* * * * *